(12) United States Patent
Shin et al.

(10) Patent No.: US 9,972,279 B2
(45) Date of Patent: May 15, 2018

(54) METHOD FOR PROVIDING AREA OF IMAGE DISPLAYED ON DISPLAY APPARATUS IN GUI FORM USING ELECTRONIC APPARATUS, AND ELECTRONIC APPARATUS APPLYING THE SAME

(71) Applicant: Samsung Electronics Co., Ltd., Suwon-si, Gyeonggi-do (KR)

(72) Inventors: Chang-beom Shin, Seoul (KR); Han-chul Jung, Seoul (KR); O-jae Kwon, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days. days.

(21) Appl. No.: 15/198,935

(22) Filed: Jun. 30, 2016

(65) Prior Publication Data
US 2016/0313807 A1  Oct. 27, 2016

Related U.S. Application Data

(63) Continuation of application No. 12/126,092, filed on May 23, 2008.

(30) Foreign Application Priority Data

Jan. 7, 2008  (KR) .................. 10-2008-0001943

(51) Int. Cl.
G09G 5/12  (2006.01)
G06F 3/0484  (2013.01)
(Continued)

(52) U.S. Cl.
CPC ............... G09G 5/12 (2013.01); G06F 3/033 (2013.01); G06F 3/038 (2013.01); G06F 3/0346 (2013.01);
(Continued)

(58) Field of Classification Search
CPC ...... G06F 3/1454; G06F 3/1462; G06F 3/033; G06F 3/0346; G06F 3/0354; G06F 3/038;
(Continued)

(56) References Cited

U.S. PATENT DOCUMENTS 5,146,049 A * 9/1992 Shima ................... G06F 3/0488
345/157
5,949,351 A  9/1999 Hahm
(Continued)

FOREIGN PATENT DOCUMENTS

KR  10-0164089 B1  12/1998
KR  10-2003-0052648 A  6/2003

*Primary Examiner* — Patrick F Marinelli
(74) *Attorney, Agent, or Firm* — Jefferson IP Law, LLP

(57) ABSTRACT

An electronic apparatus to provide an area of an image displayed on a display apparatus in a GUI form. The electronic apparatus transfers a user command related to an external apparatus to the external apparatus, and displays an area of an image displayed on the external apparatus on a display. Therefore, it is possible to display an area of an image displayed on a display apparatus in the GUI form using another display apparatus so that the user may select a desired GUI item more conveniently and more intuitively.

13 Claims, 10 Drawing Sheets

(51) Int. Cl.
  *G06F 3/038* (2013.01)
  *G06F 3/0354* (2013.01)
  *G06F 3/033* (2013.01)
  *G06F 3/14* (2006.01)
  *H04N 21/431* (2011.01)
  *G06F 3/0488* (2013.01)
  *G06F 3/0482* (2013.01)
  *H04N 21/422* (2011.01)
  *G06F 3/0346* (2013.01)
  *H04N 5/44* (2011.01)
  *H04N 21/4782* (2011.01)
  *H04N 21/41* (2011.01)

(52) U.S. Cl.
  CPC .......... *G06F 3/0354* (2013.01); *G06F 3/0482* (2013.01); *G06F 3/0488* (2013.01); *G06F 3/04842* (2013.01); *G06F 3/04845* (2013.01); *G06F 3/04847* (2013.01); *G06F 3/14* (2013.01); *G06F 3/1454* (2013.01); *G06F 3/1462* (2013.01); *H04N 5/4403* (2013.01); *H04N 21/42207* (2013.01); *H04N 21/42209* (2013.01); *H04N 21/42222* (2013.01); *H04N 21/42224* (2013.01); *H04N 21/4312* (2013.01); *H04N 21/4131* (2013.01); *H04N 21/4782* (2013.01); *H04N 2005/441* (2013.01); *H04N 2005/443* (2013.01)

(58) Field of Classification Search
  CPC ............. G06F 3/04842; G06F 3/04845; G06F 3/04847; G06F 3/0488
  USPC ......... 345/156–184, 1.1–3.1, 4–5; 710/1–74; 715/856–862
  See application file for complete search history.

(56) References Cited

U.S. PATENT DOCUMENTS

| | | | |
|---|---|---|---|
| 6,329,984 B1* | 12/2001 | Boss | G06F 3/0481 715/204 |
| 6,710,754 B2* | 3/2004 | Hanson | G06F 1/1601 345/1.2 |
| 6,755,533 B2 | 6/2004 | Fraser et al. | |
| 6,931,661 B2* | 8/2005 | Smith | H04N 1/32776 345/626 |
| 7,057,579 B2* | 6/2006 | Hanson | G06F 1/1601 345/1.2 |
| 7,855,714 B2 | 12/2010 | Scott et al. | |
| 8,035,850 B2* | 10/2011 | Lapstun | B41J 3/445 358/1.15 |
| 8,269,719 B1* | 9/2012 | Kim | G06F 3/04895 345/156 |
| 2002/0136540 A1* | 9/2002 | Adams | B60R 11/0211 386/232 |
| 2003/0098832 A1 | 5/2003 | Fraser et al. | |
| 2003/0098845 A1* | 5/2003 | Hanson | G06F 1/1601 345/156 |
| 2004/0041791 A1 | 3/2004 | Dunker | |
| 2004/0130568 A1* | 7/2004 | Nagano | G06F 3/1454 715/733 |
| 2004/0207654 A1* | 10/2004 | Hasuike | G06F 17/30905 345/698 |
| 2004/0239581 A1 | 12/2004 | Hanson et al. | |
| 2004/0263424 A1* | 12/2004 | Okuley | G06F 3/1446 345/1.1 |
| 2006/0209094 A1* | 9/2006 | Usuda | G06F 3/0485 345/684 |
| 2007/0040838 A1* | 2/2007 | Jeffrey | G06T 3/40 345/501 |
| 2007/0052617 A1* | 3/2007 | Hanson | G06F 1/1601 345/1.3 |
| 2008/0150921 A1* | 6/2008 | Robertson | G06F 3/0481 345/204 |
| 2009/0174653 A1* | 7/2009 | Shin | G06F 3/0346 345/156 |
| 2010/0182411 A1 | 7/2010 | Lapstun et al. | |
| 2015/0145750 A1* | 5/2015 | Shin | G06F 3/1454 345/2.2 |
| 2016/0313807 A1* | 10/2016 | Shin | G06F 3/0346 |

* cited by examiner

METHOD FOR PROVIDING AREA OF IMAGE DISPLAYED ON DISPLAY APPARATUS IN GUI FORM USING ELECTRONIC APPARATUS, AND ELECTRONIC APPARATUS APPLYING THE SAME

CROSS-REFERENCE TO RELATED APPLICATIONS

This application is a continuation application of prior application Ser. No. 12/126,092, filed on May 23, 2008, which claimed the benefit under 35 U.S.C. § 119(a) of a Korean patent application filed on Jan. 7, 2008 in the Korean Intellectual Property Office and assigned Serial number 10-2008-0001943, the entire disclosure of which is hereby incorporated by reference.

BACKGROUND OF THE INVENTION

1. Field of the Invention

Aspects of the present invention relate to a graphical user interface (GUI) providing method and an electronic apparatus applying the method, and more particularly, to a GUI providing method which enables a user to interface with a display apparatus, and an electronic apparatus applying the method.

2. Description of the Related Art

Graphical user interfaces (GUI), by which users may select GUI items such as icons, menus, or anchors displayed on display apparatuses using pointers, have become widespread. In order to input user commands in such GUI environments, a user may move a pointer to a desired item using an input device such as a mouse or a touch pad, and may press a specific key on the input device to input a command to execute a specific function of the item indicated by the pointer.

However, movement of the pointer to the desired item using the input device may be troublesome to the user. This trouble may increase when the size of a display apparatus (such as a large screen television) becomes larger but the size of items becomes smaller.

Additionally, if GUI items are grouped together on one area of a display apparatus, more exact manipulation is required to move the pointer. There is demand for a more convenient manipulation method when using a GUI, and, therefore, there is a need for methods by which the user may select a desired GUI item more conveniently.

SUMMARY OF THE INVENTION

Aspects of the present invention relate to a method for displaying an area of an image displayed on a display apparatus in the form of a graphical user interface (GUI) using another display apparatus so that the user may select a desired GUI item more conveniently and more intuitively, and an electronic apparatus applying the method.

According to an embodiment of the present invention, an electronic apparatus is provided. The electronic apparatus includes a display; a communication unit communicably connected to an external apparatus; and a control unit to transfer a user command related to the external apparatus to the external apparatus via the communication unit, and to control an area of an image displayed on the external apparatus to be displayed on the display.

According to another aspect of the present invention, the area of the image displayed on the display appears to a user to be greater in size than the corresponding area of the image displayed on the external apparatus.

According to another aspect of the present invention, the area of the image includes graphical user interface (GUI) items selectable by the user. The control unit transfers information regarding a GUI item selected by the user to the external apparatus via the communication unit so as to transmit the user command related to the external apparatus to the external apparatus.

According to another aspect of the present invention, the display is a touch screen, and the control unit transfers information regarding a GUI item touched by the user among GUI items in an area of an image displayed on the touch screen to the external apparatus via the communication unit.

According to another aspect of the present invention, the electronic apparatus further includes a sensing unit to detect movement of the electronic apparatus. The area of the image displayed on the display changes according to the movement of the electronic apparatus detected by the sensing unit.

According to another aspect of the present invention, the control unit transmits information regarding the movement of the electronic apparatus detected by the sensing unit to the external apparatus via the communication unit, and controls the area of the image received via the communication unit from the external apparatus to be displayed on the display.

According to another aspect of the present invention, the direction of the movement of the electronic apparatus detected by the sensing unit corresponds to the direction in which the area of the image changes.

According to another aspect of the present invention, when the user inputs the user command related to the external apparatus using the electronic apparatus, the distance between the electronic apparatus and the user is less than the distance between the external apparatus and the user.

According to another aspect of the present invention, the electronic apparatus further includes a capturing unit to capture an area of an image displayed on the external apparatus. The control unit transmits the area of the image captured by the capturing unit to the external apparatus via the communication unit, and receives information regarding GUI items in the area of the image from the external apparatus via the communication unit.

According to another aspect of the present invention, the external apparatus is a broadcast receiving apparatus, and the electronic apparatus is a remote controller of the broadcast receiving apparatus.

According to another embodiment of the present invention, a method of providing a graphical user interface (GUI) is provided. The method includes displaying an area of an image displayed on an external apparatus communicably connected to an electronic apparatus in a GUI form on the electronic apparatus; and transferring a user command input using the area of the image displayed on the electronic apparatus to the external apparatus.

According to another aspect of the present invention, the area of the image displayed on the electronic apparatus appears to a user to be greater in size than the corresponding area of the image displayed on the external apparatus.

According to another aspect of the present invention, the area of the image includes GUI items selectable by the user. The transferring of the user command includes transferring information regarding a GUI item selected by the user to the external apparatus so as to transmit the user command to the external apparatus.

According to another aspect of the present invention, the transferring of the user command includes transferring information regarding a GUI item touched by the user among GUI items in an area of an image displayed on a touch screen of the electronic apparatus to the external apparatus.

According to another aspect of the present invention, the method further includes detecting movement of the electronic apparatus. The area of the image displayed on the electronic apparatus changes according to the detected movement of the electronic apparatus.

According to another aspect of the present invention, the direction of the detected movement of the electronic apparatus may correspond to the direction in which the area of the image changes.

According to another embodiment of the present invention provided a display apparatus is provided. The apparatus includes a display; a communication unit communicably connected to an electronic apparatus; and a control unit to execute a user command received from the electronic apparatus via the communication unit, and to transfer information regarding graphical user interface (GUI) items in an area of an image displayed on the display to the electronic apparatus via the communication unit.

According to another embodiment of the present invention, an electronic apparatus to transfer user commands related to peripheral apparatuses to the corresponding peripheral apparatuses is provided. The apparatus includes a display; a communication unit communicably connected to the peripheral apparatuses; and a control unit to determine which peripheral apparatus is facing the electronic apparatus and to display a graphical user interface (GUI) representing the peripheral apparatus found as a result of the determination.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1A:
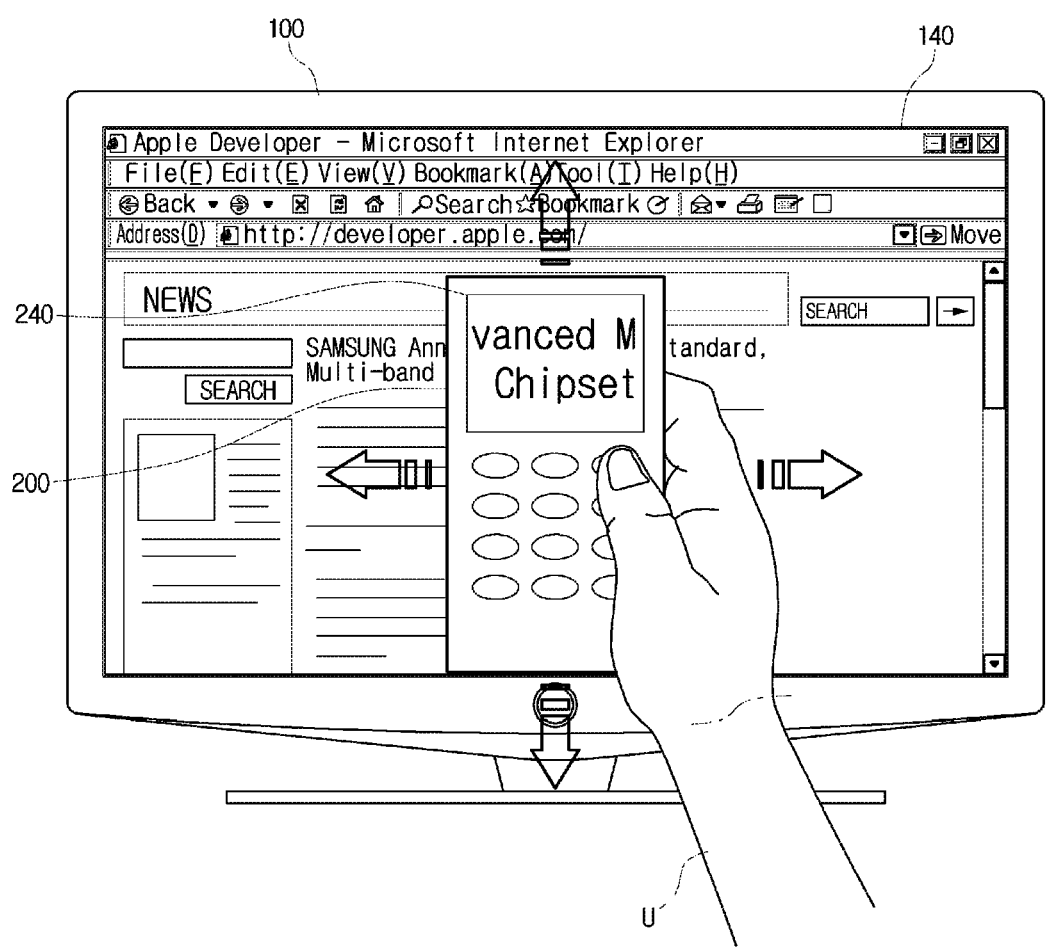
FIGS. 1A and 1B illustrate a broadcast receiving system to which the present invention is applicable.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1A shows a broadcast receiving system according to an embodiment of the present invention. The broadcast receiving system of FIG. 1A includes a digital television (DTV) 100 as a broadcast receiving apparatus, and a remote controller 200 as a user input device. Although described with respect to a broadcast receiving apparatus, aspects of the present invention are applicable to any external apparatus usable with a remote control, such as a computer, a reproducing apparatus, a set-top box, a video game console, or a multi-function device.

The DTV 100 provides a user U with a broadcast received by a broadcast medium by displaying the broadcast on a display 140. Additionally, the DTV 100 provides the user U with a Web page received via the Internet by displaying the Web page on the display 140. FIG. 1A shows a situation in which a Web page is displayed on the display 140.

The remote controller 200 sends operation commands by the user U to the DTV 100, and the DTV 100 operates according to the received input commands. The remote controller 200 includes a touch screen 240. As shown in FIG. 1A, the area of an image displayed on the display 140 of the DTV 100 (hereinafter, referred to as the "area of the display image") may also be displayed on the touch screen 240 on the remote controller 200.

The image displayed on the touch screen 240 may appear to the user U to be greater in size than the area of the display image. This may be because the actual size of the image displayed on the touch screen 240 is greater than that of the area of the display image, or because the actual size of the image displayed on the touch screen 240 is smaller than that of the area of the display image but the distance between the user U and the remote controller 200 is less than the distance between the user U and the DTV 100.

As indicated by arrows in FIG. 1A, the user U may move the remote controller 200 in an upwards or downwards direction, or to the left or right, or in a direction combining two of these directions, such as an upper-leftwards direction, for instance. The remote controller 200 may be moved in any direction.

Figure 1B:
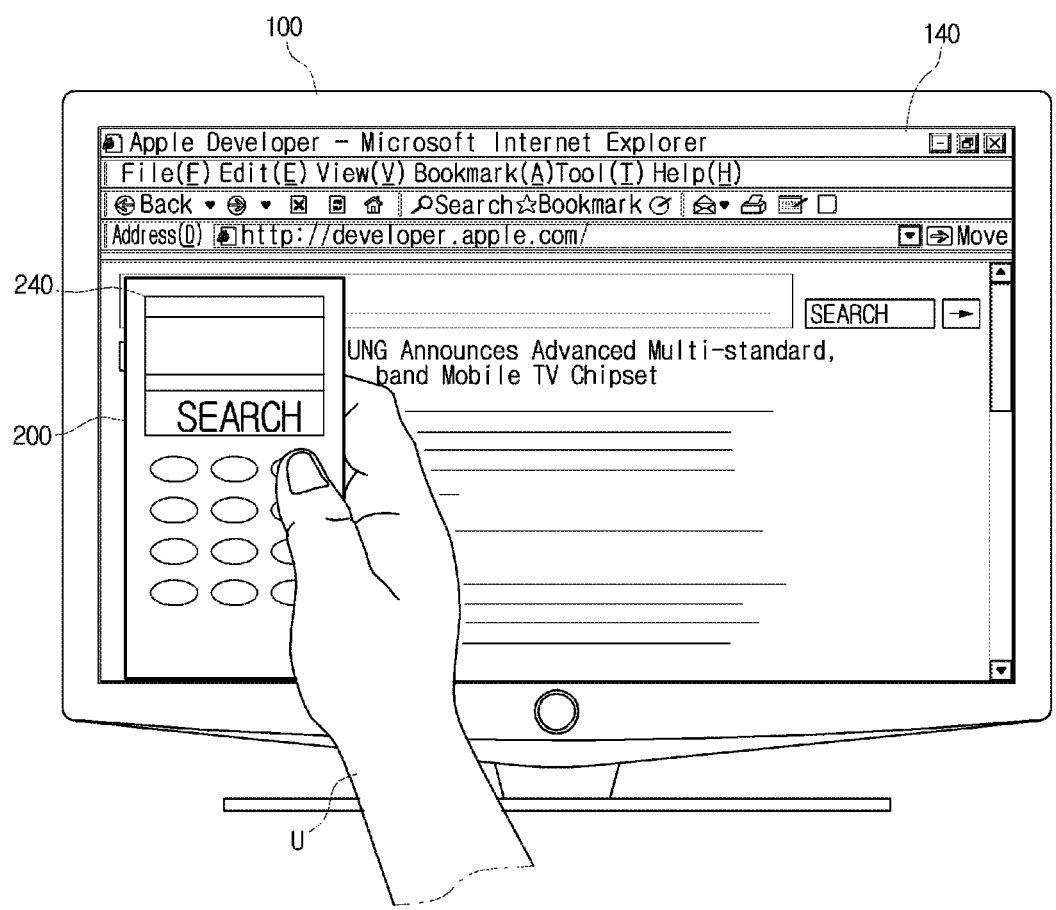

For example, the remote controller 200 may be moved while drawing a locus on a virtual plane (VP) which is in a parallel relation with the screen of the display 140. FIG. 1B shows a situation in which the remote controller 200 is moved to the left by the user U while drawing a locus on a VP which is in a parallel relation with the screen of the display 140. As shown in FIG. 1B, the image displayed on the touch screen 240 remains on the touch screen 240 even after the remote controller 200 is moved to the left, but after a predetermined period of time, the image may be changed to another image according to the movement of the remote controller 200.

Similarly, if the remote controller 200 is moved to the left, an area to the left of the area of the display image may be displayed on the touch screen 240. If the remote controller 200 is moved to the left, that is, if a frame around the area of the display image is moved to the left, an image indicated by the frame may be displayed on the touch screen 240. An image to be displayed on the touch screen 240 may thus change in the same direction as the remote controller 200 moves.

The VP may not be in a perfect parallel relation with the screen of the display 140 of the DTV 100, and may not be a perfect plane. It is practically impossible for the movement of the remote controller 200 by the user U to be on a perfect plane and in a perfect parallel relation with the screen of the display 140. Accordingly, aspects of the present invention may be applicable to a situation in which the remote controller 200 moves on an imperfect plane and in an imperfect parallel relation with the screen of the display 140.

Figure 2A:
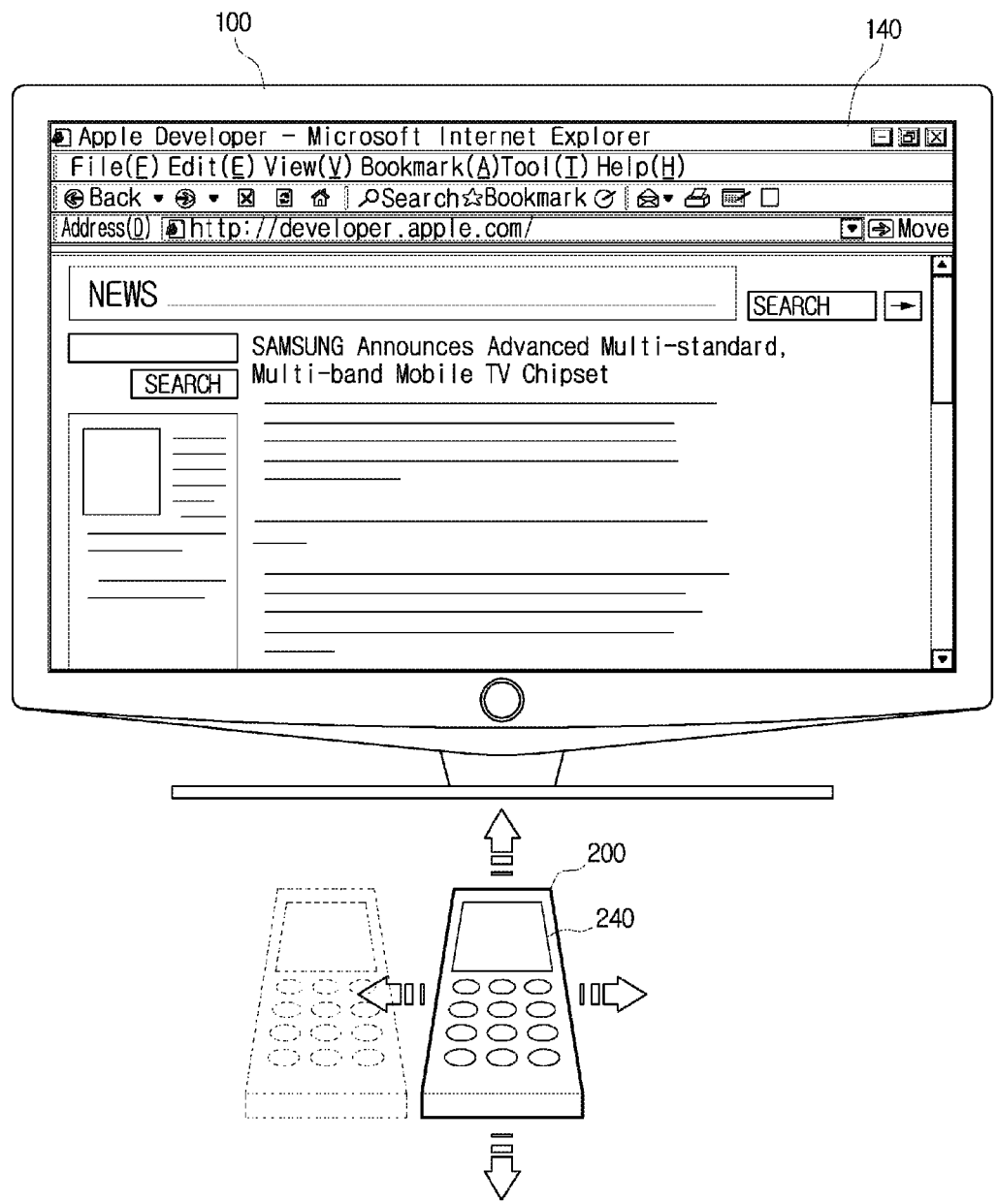
FIGS. 2A and 2B illustrate patterns by which a user may move a remote controller, according to an embodiment of the present invention.

As shown in FIG. 2A, the remote controller 200 may be moved by the user U while drawing a locus on a VP that is perpendicular to the screen of the display 140. FIG. 2A shows, using dotted lines, a situation in which the user U moves the remote controller 200 to the left while drawing a locus on the VP. In this situation, the VP may not be perfectly perpendicular to the screen of the display 140 of the DIV 100, and may not be a perfect plane. Accordingly, aspects of the present invention may be applicable to a situation in which the remote controller 200 moves on an imperfect plane and in an imperfect perpendicular relation with the screen of the display 140.

Figure 2B:
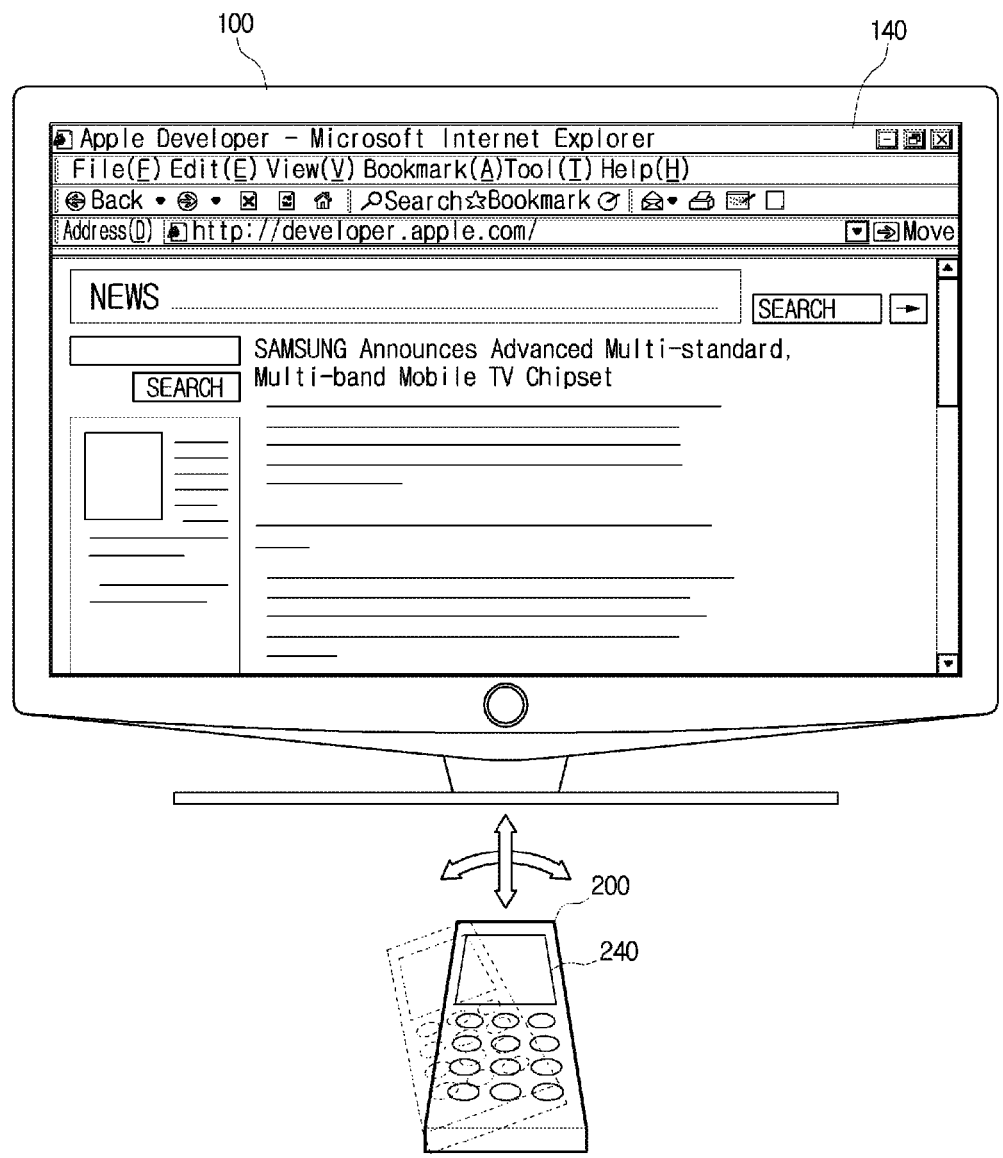

The user U may move the remote controller 200 by turning only his wrist while his arm holding the remote controller 200 is fixed. If only the wrist of the user U moves in an upwards or downwards direction, or to the left or right, or in a direction combining these, such as an upper leftward direction, the remote controller 200 may be moved upwards, downwards, or to the left or right, or in a direction combining any of these movements, such as an upper leftwards direction while drawing a curved locus on a virtual hemispherical surface. FIG. 2B shows a situation in which the remote controller 200 is moved to the left by the user U while drawing a curved locus on a virtual hemispherical surface.

The virtual hemispherical surface, on which the remote controller 200 is moved by rotation of the user's wrist, may be a mathematically imperfect hemispherical surface. It is practically impossible for the remote controller 200 to be moved by rotating the wrist of the user U while drawing a locus on a mathematically perfectly hemispherical surface. Accordingly, aspects of the present invention may be applicable to a situation in which the remote controller 200 does not move on a mathematically perfect hemisphere, but moves on an imperfect hemispherical surface while drawing a curved locus.

Figure 3:
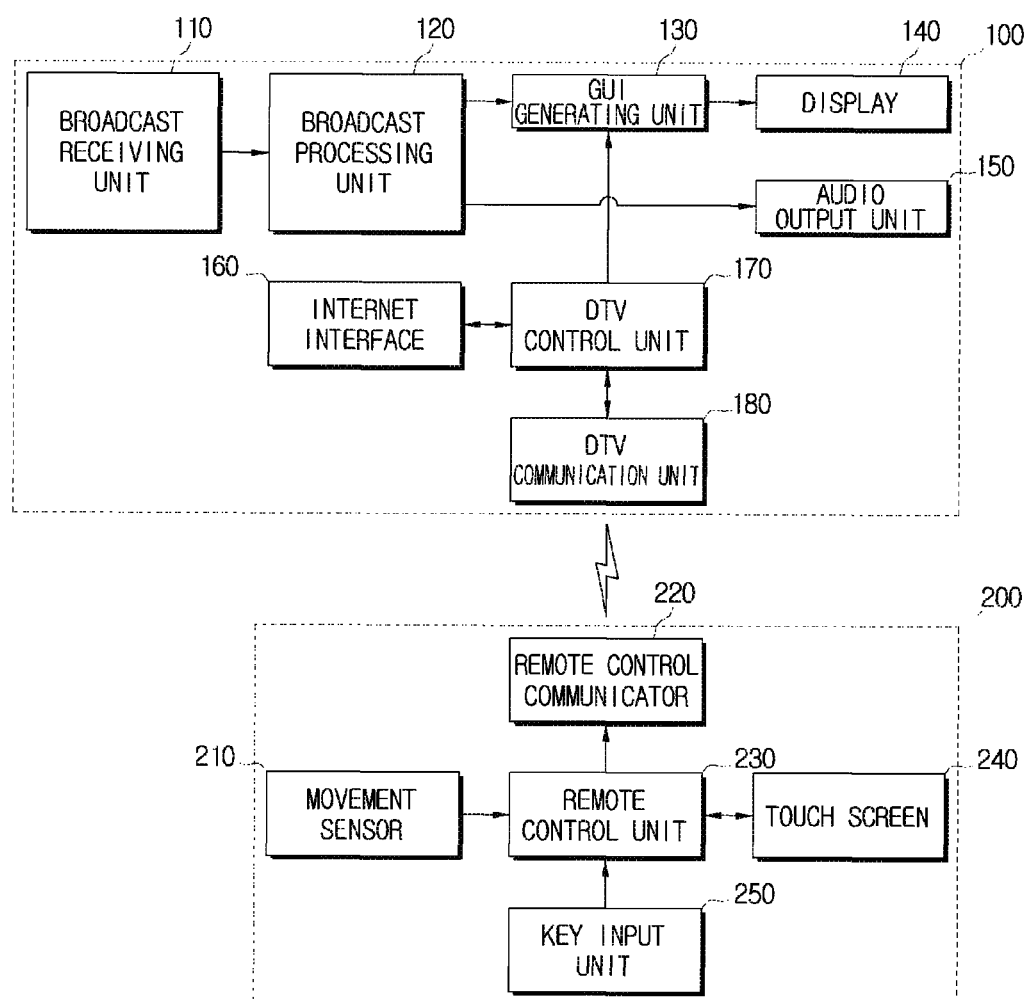
FIG. 3 is a detailed block diagram of a DIV and remote controller, according to an embodiment of the present invention.

The DIV 100 and remote controller 200 will be described in detail with reference to FIG. 3. FIG. 3 shows the DTV 100 and remote controller 200, according to an embodiment of the present invention. The remote controller 200 of FIG. 3 includes a movement sensor 210, a remote control communicator 220, a remote control unit 230, a touch screen 240 and a key input unit 250. According to other aspects of the present invention, the remote controller 200 may include additional and/or different units.

The movement sensor 210 senses movement of the remote controller 200 moved by the user U, and sends the result of sensing to the remote control unit 230, which will be described in detail below. The movement sensor 210 may be implemented as a biaxial gyro sensor or an infrared ray sensor. The remote control communicator 220 is connected to the DTV 100 to enable communication using radio frequency (RF) signals. The key input unit 250 includes a variety of keys with which the user U may input user commands. The touch screen 240 may function both as a display on which a screen is displayed and as a user input means to receive touch input by the user U, although such combined functionality is not required in all aspects.

The remote control unit 230 transmits movement information to the DTV 100 via the remote control communicator 220. The movement information may include information regarding the direction and distance of movement of the remote controller 200, which is obtained from the sensing result transmitted from the movement sensor 210. The remote control unit 230 may also send information about keys pressed by the user U using the key input unit 250 to the DTV 100 through the remote control communicator 220.

Additionally, the remote control unit 230 displays an image based on data received from the DTV 100 on the touch screen 240. The image displayed on the touch screen 240 may include a graphical user interface (GUI) item, and the user U may thus select the GUI item displayed on the touch screen 240 by touching the GUI item. Accordingly, the remote control unit 230 may send information regarding the GUI item selected by the user U through the touch screen 240 to the DTV 100 via the remote control communicator 220.

As shown in FIG. 3, the DTV 100 includes a broadcast receiving unit 110, a broadcast processing unit 120, a GUI generating unit 130, a display 140, an audio output unit 150, an Internet interface 160, a DTV control unit 170 and a DTV communication unit 180.

The broadcast receiving unit 110 receives a broadcast via a wired or wireless connection from a broadcasting station or a satellite, and demodulates the received broadcast. The broadcast processing unit 120 performs signal processing, such as video decoding, video scaling, and audio decoding of the broadcast output from the broadcast receiving unit 110. Additionally, the broadcast processing unit 120 transmits video signals and audio signals to the GUI generator 130 and the audio output unit 150, respectively.

The GUI generating unit 130 generates a GUI that will be displayed on the display 140, and combines the GUI with the video output from the broadcast processing unit 120. The display 140 displays the video combined with the GUI output from the GUI generating unit 130. The audio output unit 150 outputs the audio signals output from the broadcast processing unit 120 to a speaker. The Internet interface 160 is communicably connected to the Internet, and receives a Web page from a Web server connected to the Internet.

The DTV control unit 170 processes the Web page received via the Internet interface 160 and sends the processed Web page to the GUI generating unit 130, so that the Web page may be displayed on the display 140. The DTV control unit 170 recognizes the commands of the user U based on information regarding the operation provided by the user U, including movement of the remote controller 200, key input, or touch of a GUI item, which are received via the DTV communication unit 180 from the remote controller 200. The DTV control unit 170 controls the entire operation of the DTV 100 according to the recognized commands of the user U.

A process for providing the user U with an area of a display image in the form of a GUI using the touch screen 240 on the remote controller 200 in the broadcast receiving system of FIG. 3 will be described in detail with reference to FIG. 4, which shows a flowchart of a process for providing an area of a display image in the form of the GUI using the touch screen 240 on the remote controller 200 in the broadcast receiving system shown in FIG. 3, according to an embodiment of the present invention.

Figure 4:
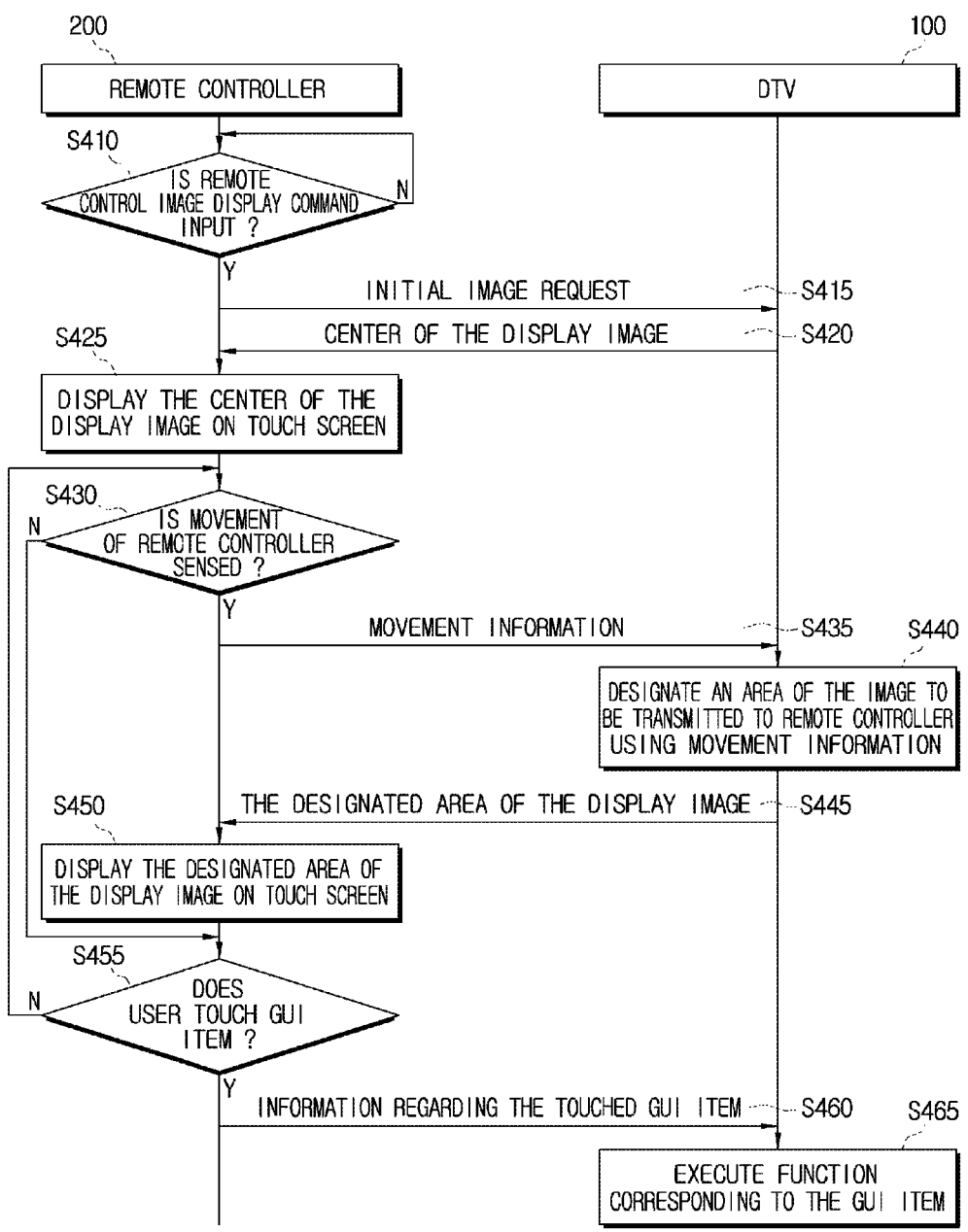
FIG. 4 is a flowchart of a process for providing a user with an area of a display image in the form of a GUI using a touch screen on a remote controller in a broadcast receiving system shown in FIG. 3.

In the flowchart of FIG. 4, operations performed by the remote controller 200 are shown on the left, and operations performed by the DTV 100 are shown on the right. Text in the center of FIG. 4 refers to messages, data, or information received and transmitted between the DTV 100 and remote controller 200. If the user U inputs a remote control image display command using the key input unit 250 on the remote controller 200 in operation S410-Y, the remote control unit 230 transmits an initial image request message to the DTV 100 through the remote control communicator 220 in operation S415.

The remote control image display command may be a user command to display the area of the display image on the touch screen 240 on the remote controller 200. As described above, the area of the display image refers to the area of the image displayed on the display 140 of the DTV 100.

In response to the initial image request message, the DTV control unit 170 transmits data regarding the central area of an image currently displayed on the display 140 (hereinafter, referred to as "center of the display image") to the remote controller 200 through the DTV communication unit 180 in operation S420. For example, if the image currently displayed on the display 140 is a Web page written in Hypertext Markup Language (HTML), the DTV control unit 170 may transmit HTML data regarding the center of the display image to the remote controller 200.

In operation S425, the remote control unit 230 scales an image using the data received from the DTV control unit 170 to fit on the touch screen 240, and displays the scaled image on the touch screen 240, so that the center of the display image may be displayed on the touch screen 240. If the movement sensor 210 senses movement of the remote controller 200 in operation S430-Y, the remote control unit 230 transmits movement information regarding the remote controller 200 to the DTV 100 via the remote control communicator 220 in operation S435.

The DTV control unit 170 designates an area of the display image to be transmitted to the remote controller 200, using the movement information received from the remote control unit 230, in operation S440. The movement information may include information regarding the direction and distance in which the remote controller 200 moves, so that the DTV control unit 170 may take into consideration both the direction and the distance during operation S440.

Figure 5:
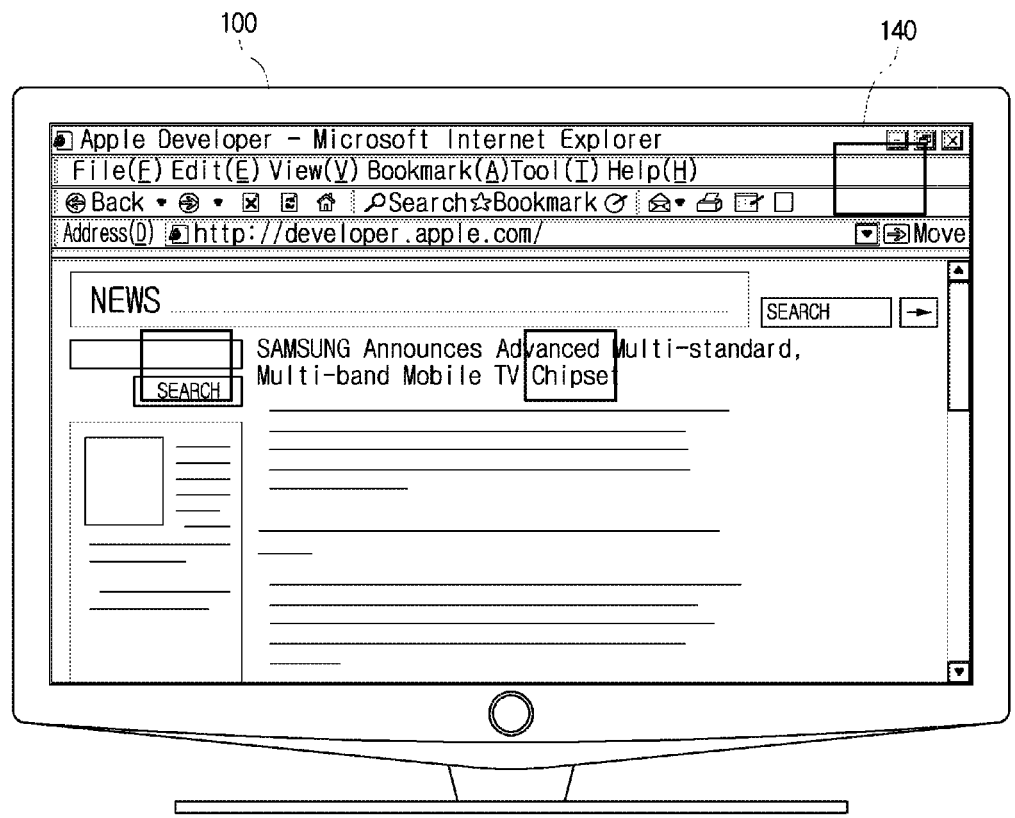
FIG. 5 illustrates operation S440 of FIG. 4 in more detail, according to an embodiment of the present invention.

FIG. 5 shows, in more detail, operation S440 of FIG. 4, by which the DTV control unit 170 designates an area of the display image to be transmitted to the remote controller 200. In FIG. 5, an image indicated by a frame on the center of the display 140 corresponds to the center of the display image transmitted to the remote controller 200 in operation S420.

If the remote controller 200 is moved to the left by approximately 10 cm, the DTV control unit 170 designates an image indicated by a frame on the left of the display 140 shown in FIG. 5 to be transmitted to the remote controller 200 during operation S440. Alternatively, if the remote controller 200 is moved to the upper right by approximately 15 cm, the DTV control unit 170 designates an image indicated by a frame on the upper right of the display 140 shown in FIG. 5 to be transmitted to the remote controller 200 during operation S440. Subsequently, the DTV control unit 170 transmits data regarding the image designated in operation S440 to the remote controller 200 via the DTV communication unit 180 in operation S445 of FIG. 4.

The remote control unit 230 scales an image using the data received from the DIN control unit 170 to fit on the touch screen 240 and displays the scaled image on the touch screen 240, so that the image designated in operation S440 may be displayed on the touch screen 240 in operation S450. The image displayed on the touch screen 240 as a result of operation S450 may include GUI items. As shown in FIG. 1B, a field "SEARCH" displayed on the touch screen 240 and an input window disposed above the field "SEARCH" are used as GUI items. The user U may select a desired GUI item from among the GUI items displayed on the touch screen 240 by touching the GUI item.

If the user U touches one of the GUI items displayed on the touch screen 240 in operation S455-Y, the remote control unit 230 transmits information regarding the touched GUI item to the DTV 100 via the remote control communicator 220 in operation S460. The DTV control unit 170 determines which GUI item is selected by the user U, using the information regarding the touched GUI item received from the remote control unit 230, and executes a function corresponding to the selected GUI item in operation S465.

For example, if the user U touches the field "SEARCH", the DTV control unit 170 may search the Internet using a search term entered in the input window. Alternatively, if the user U touches a hypertext anchor, the DTV control unit 170 connected to the Internet interface 160 requests a Web page linked to the hypertext anchor from a Web server connected to the Internet.

Although the user U inputs the remote control image display command using the key input unit 250 on the remote controller 200 as described above, any method by which the user U is able to input the remote control image display command can be used. For example, in order to input the remote control image display command, the user U may touch the touch screen 240 on the remote controller 200 or may shake the remote controller 200 horizontally, instead of using the key input unit 250.

Additionally, the center of the image currently displayed on the display 140 is set to be an initial image displayed on the touch screen 240 in response to the remote control image display command, but this is only for convenience of description. Accordingly, areas other than the center of the image currently displayed on the display 140 may be set to be an initial image displayed on the touch screen 240.

Furthermore, the DTV 100 designates an area of the display image that will be displayed on the touch screen 240 as described above, but this is merely for convenience of description. Aspects of the present invention are also applicable to a situation in which the remote controller 200 designates an area of the display image to be displayed on the touch screen 240.

Moreover, the remote controller 200 determines which GUI item is selected by the user U as described above, but this is merely for convenience of description. Aspects of the present invention are also applicable to a situation in Which the DTV 100 determines which GUI item is selected by the user U.

Additionally, the touch screen 240 may be another display, and the remote controller 200 may be a mobile phone, a personal multimedia player (PMP), a digital camera or an ultra-mobile personal computer (UMPC). The DTV 100 may also be replaced by another display apparatus.

Figure 6:
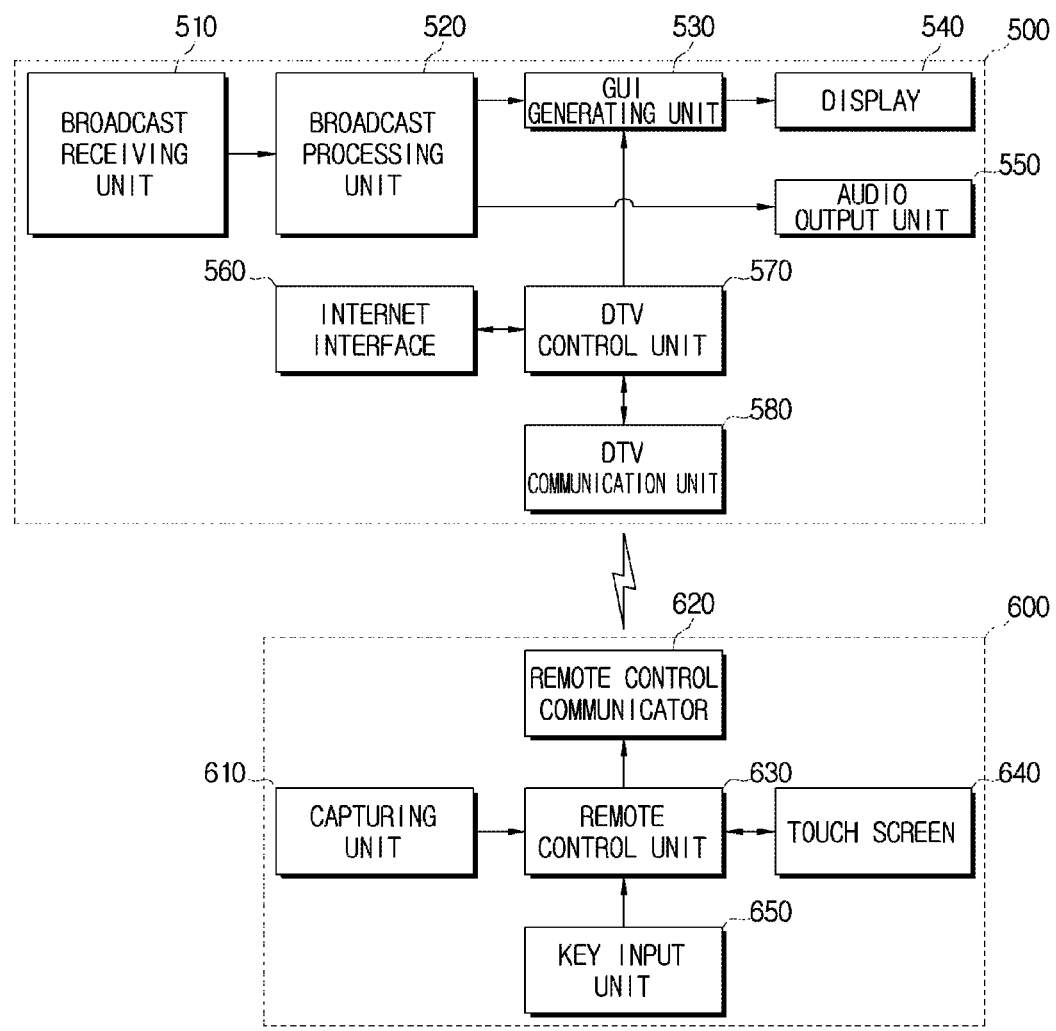
FIG. 6 is a detailed block diagram of a DTV and remote controller, according to another embodiment of the present invention.

A second embodiment of the present invention will be described with reference to FIG. 6. FIG. 6 shows a DTV 500 and a remote controller 600, according to the second embodiment of the present invention. The remote controller 600 of FIG. 6 includes a capturing unit 610, a remote control communicator 620, a remote control unit 630, a touch screen 640 and a key input unit 650.

The capturing unit 610 captures an area of an image displayed on a display 540 (hereinafter, referred to as "an area of a display image"). Data regarding the area of the display image captured by the capturing unit 610 is transferred to the remote control unit 630, which will be described in detail below. The capturing unit 610 may be disposed on the rear side of the remote controller 600. For example, if the remote controller 600 is placed as shown in FIGS. 1A and 1B, the capturing unit 610 may capture one area of the display image.

The remote control communicator 620 is connected to a DTV 500 to enable communication using RF signals, or other signals, such as infrared. The key input unit 650 includes a variety of keys by which the user U may input user commands. The touch screen 640 functions as a display on which a screen is displayed and as a user input device to receive touch input by the user U.

The remote control unit 630 transmits information regarding the area of the display image captured by the capturing unit 610 to the DTV 500 via the remote control communicator 620. The remote control unit 630 also sends information about keys pressed by the user U using the key input unit 650 to the DTV 500 through the remote control communicator 620.

Additionally, the remote control unit 630 displays an image based on data received from the DTV 500 on the touch screen 640. The image displayed on the touch screen 640 may include a GUI item, and the user U may thus select the GUI item displayed on the touch screen 640 by touching the GUI item. Accordingly, the remote control unit 630 may send information regarding the GUI item selected by the user U through the touch screen 640 to the DTV 500 via the remote control communicator 620.

The DTV 500 of FIG. 6 includes a broadcast receiving unit 510, a broadcast processing unit 520, a GUI generating unit 530, a display 540, an audio output unit 550, an Internet interface 560, a DTV control unit 570 and a DTV communication unit 580. The broadcast receiving unit 510, broadcast processing unit 520, GUI generating unit 530, display 540, audio output unit 550, Internet interface 560 and DTV communication unit 580 of the DTV 500 as shown in FIG. 6 are configured in a similar manner as the broadcast receiving unit 110, broadcast processing unit 120, GUI generating unit 130, display 140, audio output unit 150, Internet interface 160 and DTV communication unit 180 of the DTV 100 as shown in FIG. 2, so detailed description thereof is omitted.

The DTV control unit 570 processes the Web page received via the Internet interface 560, and sends the processed Web page to the GUI generating unit 530, so that the Web page may be displayed on the display 540. The DTV control unit 570 recognizes the commands of the user U based on information regarding the operation, provided by the user U, including movement of the remote controller 600, key input or touch of a GUI item, which is received from the remote controller 600. The DTV control unit 570 controls the entire operation of the DTV 500 according to the recognized commands of the user U.

Figure 7:
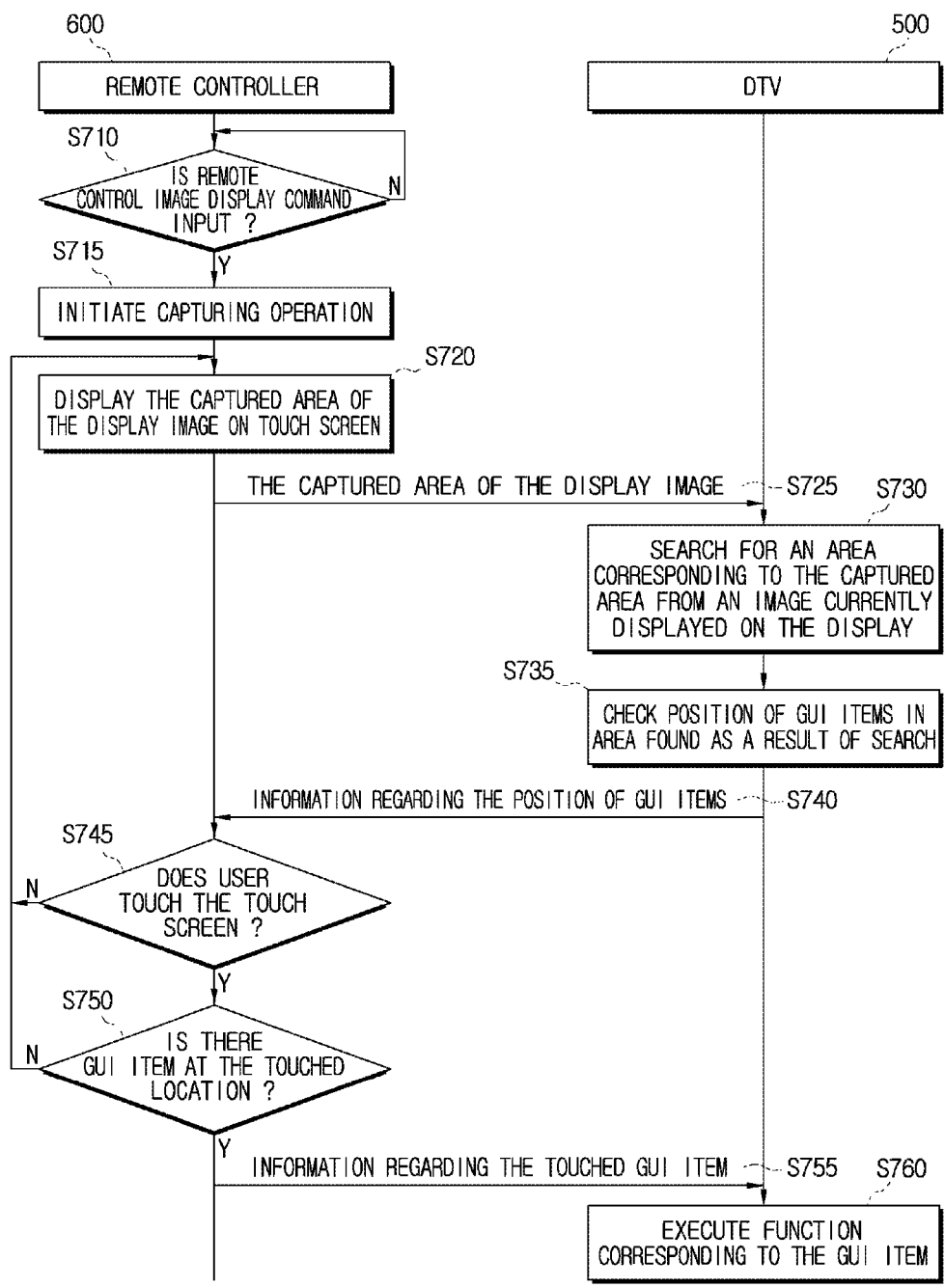
FIG. 7 is a flowchart of a process for providing a user with an area of a display image in the form of a GUI using a touch screen on a remote controller in a broadcast receiving system shown in FIG. 6.

A process of providing the user U with an area of a display image in the form of a GUI using the touch screen 640 of the remote controller 600 in a broadcast receiving system of FIG. 6 will be described in detail with reference to FIG. 7. In the flowchart of FIG. 7, operations performed by the remote controller 600 are shown on the left, and operations performed by the DTV 500 are shown on the right. Text in the center of FIG. 7 refers to messages, data, or information received and transmitted between the DTV 500 and the remote controller 600.

In FIG. 7, if the user U inputs a remote control image display command using the key input unit 650 on the remote controller 600 in operation S710-Y, the remote control unit 630 controls the capturing unit 610 to initiate a capturing operation in operation S715. If the user U causes a lens of the capturing unit 610 to face the display 540 of the DTV 500 (for example, if the lens is disposed on the rear side of the remote controller 600 when the user U grips the remote controller 600 as shown in FIG. 1A or 1B), the capturing unit 610 captures an area of the display image entered through the lens.

The remote control image display command refers to a user command to display the area of the display image on the touch screen 640 on the remote controller 600. As described above, the area of the display image refers to the area of the image displayed on the display 540 of the DTV 500. The remote control unit 630 displays the area of the display image captured by the capturing unit 610 on the touch screen 640 in operation S720, and transfers the captured area of the display image to the DTV 500 via the remote control communicator 620 in operation S725.

The DTV control unit 570 searches for an area corresponding to the captured area received from the remote control unit 630 from an image currently displayed on the display 540 in operation S730. In operation S730, the DTV control unit 570 may compare the captured area received from the remote control unit 630 to the image currently displayed on the display 540, to perform the search. The DTV control unit 570 checks the position of GUI items in the area found as a result of the search in operation S735, and then transfers information regarding the position of the GUI items to the remote controller 600 via the DTV communication unit 580 in operation S740.

If the user U touches the touch screen 640 in operation S745-Y, the remote control unit 630 determines whether there is a GUI item at the location of the touch screen 640 touched by the user in operation S750. The remote control unit 630 determines the existence or nonexistence of the GUI item at the touched location based on the information regarding the position of the GUI items received from the DTV control unit 570.

If the user touched a GUI item, the remote control unit 630 transmits information regarding the GUI item touched by the user U to the DTV 500 in operation S755. In this situation, the information regarding the GUI item includes information regarding the GUI item disposed on the location touched by the user in operation S745.

The DTV control unit 570 determines which GUI item is selected by the user U, using the information regarding the GUI item received from the remote control unit 630, and executes a function corresponding to the selected GUI item in operation S760.

Although the user U inputs the remote control image display command using the key input unit 650 on the remote controller 600 as described above, any method by which the user U is able to input the remote control image display command can be used.

Additionally, the lens of the capturing unit 610 is disposed on the rear side of the remote controller 600 as described above, but this is only for convenience of description, and accordingly the lens may be disposed on the remote controller 600 in any position. For example, the lens may be disposed on the front side of the remote controller 600. In this situation, the user U causes the remote controller 600 to be disposed as shown in FIG. 2A or 2B, and to capture an area of a display image.

Furthermore, the area of the display image captured by the capturing unit 610 is displayed on the touch screen 640 as described above, but this is merely for convenience of description. Aspects of the present invention are also applicable to a situation in which the DTV 500 transmits data found as a result of the search of operation S730 to the remote controller 600 and the remote controller 600 displays an image corresponding to the received data on the touch screen 640.

Moreover, the remote controller 600 determines which GUI item is selected by the user U from the touch screen 640 as described above, but this is merely for convenience of description. Aspects of the present invention are also applicable to a situation in which the DTV 500 determines which GUI item is selected by the user U. Additionally, the touch screen 640 may be replaced by another display, and the remote controller 600 may be replaced by a mobile phone, a PMP, a digital camera or a UMPC. The DTV 500 may also be replaced by another display apparatus, such as a computer monitor or a television.

Figure 8:
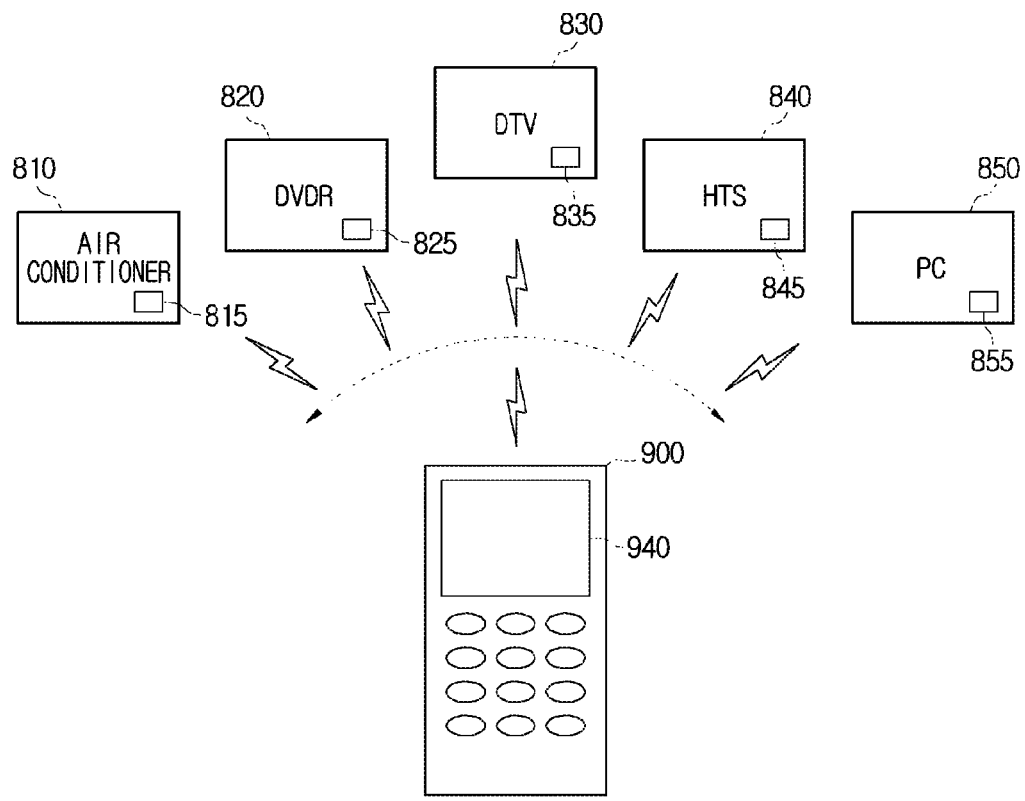
FIG. 8 illustrates a video system according to another embodiment of the present invention.

A third embodiment of the present invention will be described in detail with reference to FIG. 8. FIG. 8 illustrates a video system according to the third embodiment of the present invention. The video system of FIG. 8 is configured in such a manner that home appliances, such as an air conditioner 810, a digital versatile disc recorder (DVDR) 820, a DTV 830, a home theater system (HTS) 840 and a PC 850, are connected to a remote controller 900, enabling mutual communication.

The home appliances 810 to 850 each include respective radio frequency identification (RFID) tags 815 to 855. Each of the RFID tags 815 to 855 includes information regarding the respective home appliances 810 to 850 to which each of the RFID tags 815 to 855 belongs. For example, the RFID tag 835 in the DTV 830 may include ID information indicating the DTV 830.

If a user causes a front end of the remote controller 900 to indicate a specific home appliance, the remote controller 900 may read an RFID tag in the home appliance indicated by the front end of the remote controller 900, and may search for the home appliance from the home appliances 810 to 850. Additionally, the remote controller 900 may provide the user with a menu screen related to the home appliance found as a result of the search in the form of a GUI.

Figure 9:
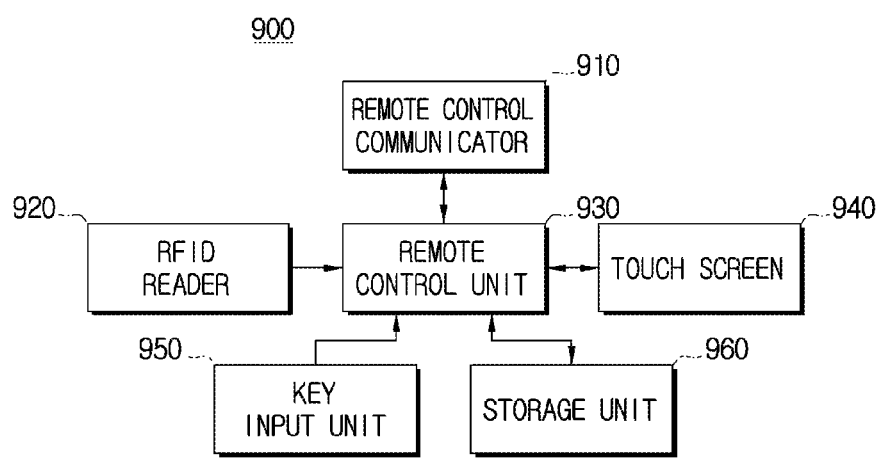
FIG. 9 is a detailed block diagram of a remote controller shown in FIG. 8.

The remote controller 900 shown in FIG. 8 will be described in detail with reference to FIG. 9. FIG. 9 is a detailed block diagram of the remote controller 900 shown in FIG. 8. The remote controller 900 of FIG. 9 includes a remote control communicator 910, an RFD reader 920, a remote control unit 930, a touch screen 940, a key input unit 950 and a storage unit 960.

The remote control communicator 910 is connected to the home appliances 810 to 850 to enable communication using RF signals. The RFID reader 920 reads the RFID tag in the home appliance indicated b the front end of the remote controller 900 from among the home appliances 810 to 850. The touch screen 940 functions as a display on which a screen is displayed and as a user input means to receive touch input by the user U. The key input unit 950 includes a variety of keys by which the user U may input user commands. The storage unit 960 stores menus of each of the home appliances 810 to 850.

The remote control unit 930 searches for the home appliance facing the front end of the remote controller 900, using information regarding the RFID tag read by the RFID reader 920. The remote control unit 930 reads the menu of the home appliance found by the search from the storage unit 960, and then displays the read menu on the touch screen 940, so that the user may be provided with the menu in the form of a GUI.

If the user U selects a menu item on the menu screen displayed on the touch screen 940 by touching the menu item, the remote control unit 930 may transmit information regarding the touched menu item to a corresponding home appliance via the remote control communicator 910. Accordingly, the home appliance may determine which menu item is selected by the user U, using the information regarding the menu item received from the remote controller 900, and execute a function corresponding to the menu item.

As described above, according to aspects of the present invention, it is possible to provide a user with an area of an image displayed on a display apparatus in the form of a GUI using another display. Accordingly, the user can select a desired GUI item more conveniently and more intuitively.

Aspects of the present invention can also be embodied as computer readable codes on a computer readable recording medium. The computer readable recording medium is any data storage device that can store data which can be thereafter read by a computer system. Examples of the computer readable recording medium also include read-only memory (ROM), random-access memory (RAM), CDs, DVDs, magnetic tapes, floppy disks, and optical data storage devices. Aspects of the present invention may also be embodied as carrier waves such as data transmission through the Internet). The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Although a few embodiments of the present invention have been shown and described, it would be appreciated by those skilled in the art that changes may be made in this embodiment, without departing from the principles and spirit of the invention, the scope of which is defined in the claims and their equivalents.

What is claimed is:

1. An electronic device, comprising:
   a touch screen;
   a camera including at least one lens;
   a communicator communicably connected to an external apparatus; and
   at least one processor configured to:
   in response to receiving a first user input, control to capture an area of an image displayed on the external apparatus through the camera and transmit the captured area of the image captured to the external apparatus,
   based on the capturing the area of the image, control to display the captured area of the image on the touch screen of the electronic device,
   control to receive, from the external apparatus through the communicator, location information of at least one graphical user interface (GUI) item included in the transmitted area of the image, the location information of the at least one GUI item being based on the captured area of the image transmitted from the electronic device,
   in response to receiving, through the touch screen, a user touch input on the displayed area of the image, control to identify a GUI item of the at least one GUI item corresponding to the user touch input by using the received location information of the at least one GUI item including the area of the image and location information of the user touch input on the area of the image displayed on the touch screen, and based on the identifying the GUI item of the at least one GUI item, control to transmit, through the communicator, information of the identified GUI item to the external apparatus, wherein the external apparatus is configured to execute, based on receiving the information of the GUI item from the electronic device, a function of the GUI item corresponding to the information of the GUI item, and wherein the electronic device receives the location information of the at least one GUI item included in the transmitted area of the image in response to the external apparatus searching for an area corresponding to the captured area of the image displayed on the external apparatus by comparing the captured area to the image displayed on the external apparatus, and performing a search of the area to check the location information of the at least one GUI item in the area found as a result of the search.

2. The electronic device of claim 1, wherein the area of the image displayed on the touch screen appears to a user to be greater in size than a corresponding area of the image displayed on the external apparatus.

3. The electronic device of claim 1, further comprising:
at least one sensor for detecting a movement of the electronic device,
wherein the area of the image displayed on the touch screen changes according to the movement of the electronic apparatus detected through the at least one sensor.

4. The electronic device of claim 3, wherein the at least one processor is further configured to:
control to transmit, through the communicator, information regarding the movement of the electronic device detected through the at least one sensor to the external apparatus, and
control to display the area of the image received through the communicator from the external apparatus on the touch screen.

5. The electronic device of claim 3, wherein a direction of the movement of the electronic device detected through the at least one sensor corresponds to a direction in which the area of the image changes.

6. The electronic device of claim 1, wherein, when a user inputs the user command related to the external apparatus using the electronic device, a distance between the electronic device and the user is less than a distance between the external apparatus and the user.

7. The electronic device of claim 1,
wherein the external apparatus comprises a broadcast receiving apparatus, and
wherein the electronic device comprises a remote controller of the broadcast receiving apparatus.

8. A method of providing a graphical user interface (GUI) of an electronic device, the method comprising:
in response to receiving a first user input, capturing an area of an image displayed on an external apparatus and transmitting the captured area of the image captured to the external apparatus;
based on the capturing the area of the image, displaying the captured area of the image on a touch screen of the electronic device;

receiving, from the external apparatus, location information of at least one graphical user interface (GUI) item included in the transmitted area of the image, the location information of the at least one GUI item being based on the captured area of the image transmitted from the electronic device;

in response to receiving a user touch input on the displayed area of the image, identifying a GUI item of the at least one GUI item corresponding to the user touch input by using the received location information of the at least one GUI item including the area of the image and location information of the user touch input on the area of the image displayed on the touch screen; and based on the identifying the GUI item of the at least one GUI item, transmitting information of the identified GUI item to the external apparatus, wherein the external apparatus is configured to execute, based on receiving the information of the GUI item from the electronic device, a function of the GUI item corresponding to the information of the GUI item, and wherein the electronic device receives the location information of the at least one GUI item included in the transmitted area of the image in response to the external apparatus searching for an area corresponding to the captured area of the image displayed on the external apparatus by comparing the captured area to the image displayed on the external apparatus, and performing a search of the area to check the location information of the at least one GUI item in the area found as a result of the search.

9. The method of claim 8, wherein the area of the image displayed on the electronic device appears to a user to be greater in size than a corresponding area of the image displayed on the external apparatus.

10. The method of claim 8, further comprising:
detecting a movement of the electronic device,
wherein the area of the image displayed on the electronic device changes according to the detected movement of the electronic device.

11. The method of claim 10, wherein a direction of the detected movement of the electronic device corresponds to a direction in which the area of the image changes.

12. A display apparatus, comprising:
a display;
a communicator for communicating with an electronic device; and
at least one processor configured to:
display an image comprising graphical user interface (GUI) items,
control to receive, from the electronic device through the communicator, a captured area of the image captured by the electronic device,
control to transmit, through the communicator, location information of at least one GUI item included in the received area of the image, the location information of the at least one GUI item being based on the captured area of the image received from the electronic device,
control to receive, from the electronic device through the communicator, information of a GUI item of the at least one GUI item, and
control to display, based on receiving the information of the GUI item from the electronic device, a function of the GUI item corresponding to the information of the GUI item,
wherein the electronic device is configured to identify the GUI item of the at least one GUI item corresponding to a user touch input by using the received location information of the at least one GUI item including the area of the image and location information of the user touch input on the area of the image displayed on a touch screen, and wherein the display apparatus transmits the location information of the at least one GUI item included in the received area of the image in response to the display apparatus searching for an area corresponding to the captured area of the image captured by the electronic device by comparing the captured area to the image comprised GUI items displayed on the display apparatus, and performing a search of the area to check the location information of the at least one GUI item in the area found as a result of the search.

13. The display apparatus of claim 12, wherein the area of the image displayed on the display is displayed on the electronic device, and wherein the area of the image displayed on the electronic device appears to a user to be greater in size than a corresponding area of the image displayed on the display.

\* \* \* \* \*